United States Patent
Mings et al.

(10) Patent No.: US 9,004,811 B2
(45) Date of Patent: Apr. 14, 2015

(54) SYSTEMS AND METHODS FOR AIMING ASPHALT MATERIAL FEED SENSORS

(75) Inventors: Rick Mings, Andover, MN (US); Toby Frelich, Saint Michael, MN (US); Chad Thiesse, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 10 days.

(21) Appl. No.: 13/404,077

(22) Filed: Feb. 24, 2012

(65) Prior Publication Data

US 2013/0223927 A1    Aug. 29, 2013

(51) Int. Cl.

| E01C 23/07 | (2006.01) |
|---|---|
| E01C 19/22 | (2006.01) |
| E01C 19/48 | (2006.01) |
| G01S 15/88 | (2006.01) |
| G01S 15/02 | (2006.01) |
| G01S 15/08 | (2006.01) |

(52) U.S. Cl.
CPC ............... *G01S 15/88* (2013.01); *E01C 19/48* (2013.01); *E01C 2301/06* (2013.01); *E01C 2301/16* (2013.01); *G01S 15/025* (2013.01); *G01S 15/08* (2013.01)

(58) Field of Classification Search
USPC ...................... 404/84.05, 84.1, 84.5
See application file for complete search history.

(56) References Cited

U.S. PATENT DOCUMENTS

| 3,967,912 | A | * | 7/1976 | Parker ................. 404/84.05 |
| 4,769,700 | A | * | 9/1988 | Pryor .................... 348/120 |
| 4,924,374 | A | * | 5/1990 | Middleton et al. ............ 700/57 |
| 4,933,853 | A |   | 6/1990 | Musil et al. |
| 5,155,983 | A | * | 10/1992 | Sheehan et al. ............ 56/10.2 E |
| 5,201,604 | A | * | 4/1993 | Ferguson et al. ............ 404/110 |
| 5,258,961 | A |   | 11/1993 | Sehr et al. |
| 5,327,345 | A | * | 7/1994 | Nielsen et al. ............. 701/50 |
| 5,356,238 | A | * | 10/1994 | Musil et al. ............... 404/84.1 |
| 5,401,115 | A |   | 3/1995 | Musil et al. |
| 5,430,651 | A |   | 7/1995 | Nielsen et al. |
| 5,452,966 | A | * | 9/1995 | Swisher, Jr. .............. 404/72 |
| 5,575,583 | A |   | 11/1996 | Grembowicz et al. |
| 5,588,776 | A | * | 12/1996 | Swisher et al. ............. 404/72 |
| 5,768,036 | A |   | 6/1998 | Nakagishi et al. |
| 6,112,145 | A | * | 8/2000 | Zachman ................... 701/50 |
| 6,152,238 | A | * | 11/2000 | Ferrell et al. ............... 172/2 |
| 6,244,782 | B1 | * | 6/2001 | Bitelli ..................... 404/84.1 |
| 6,736,216 | B2 | * | 5/2004 | Savard et al. ............... 172/1 |
| 7,044,680 | B2 | * | 5/2006 | Godbersen et al. ......... 404/75 |
| 7,144,191 | B2 |   | 12/2006 | Kieranen et al. |
| 7,172,363 | B2 |   | 2/2007 | Olson et al. |
| 7,484,911 | B2 |   | 2/2009 | Frelich |
| 7,850,395 | B1 | * | 12/2010 | Brenner et al. ............. 404/75 |
| 7,946,787 | B2 |   | 5/2011 | Glee et al. |
| 8,205,360 | B1 | * | 6/2012 | Vanneman et al. .......... 37/196 |
| 2002/0110419 | A1 | * | 8/2002 | Batty et al. ............... 404/84.1 |
| 2005/0147467 | A1 | * | 7/2005 | Kieranen et al. ......... 404/84.1 |

(Continued)

*Primary Examiner* — Abigail A Risic
(74) *Attorney, Agent, or Firm* — Miller, Matthias & Hull LLP

(57) ABSTRACT

A system for measuring the height of paving material distributed by an auger of a paving machine in front of a grading implement, such as a screed, is disclosed. The system includes a sonic sensor and a laser pointer. The sonic sensor generates a sonic signal which is directed at the paving material distributed by the auger. The laser pointer generates a laser beam which is similarly directed at the paving material that has been distributed by the auger. The laser beam and the sonic signal meet at a common position on the paving material.

13 Claims, 3 Drawing Sheets

(56) References Cited

U.S. PATENT DOCUMENTS

| | | | |
|---|---|---|---|
| 2006/0002233 A1* | 1/2006 | Malard | 367/128 |
| 2006/0045620 A1* | 3/2006 | Olson et al. | 404/84.1 |
| 2007/0140792 A1* | 6/2007 | Quenzi et al. | 404/84.1 |
| 2009/0193875 A1* | 8/2009 | Komninos | 73/40 |
| 2010/0178107 A1 | 7/2010 | Braddy et al. | |
| 2011/0255918 A1 | 10/2011 | Worsley et al. | |

* cited by examiner

SYSTEMS AND METHODS FOR AIMING ASPHALT MATERIAL FEED SENSORS

TECHNICAL FIELD

This disclosure relates generally paving apparatuses and more specifically to a system and method for measuring the height or thickness of paving material spread by an auger in front of a screed or grading implement and for controlling the position or location where the height measurement is taken.

BACKGROUND

In construction, road building and other industries, machines are used to controllably place loose material and convert that material into a supporting substrate. In the context of paving roads, parking lots, etc., a paving machine is typically used to deposit and preliminarily compact a paving material which is later treated via one or more compacting machines to render a relatively hard, smooth traffic-bearing surface.

A conventional paving machine includes a tractor. The tractor includes a material storage hopper and a conveyor to transport material from the hopper and within the tractor to deposit the material onto the work surface being paved. The tractor may also include an auger for spreading the material laterally in front of a grading implement, such as a screed, which is towed behind the tractor and is used to compact and control the thickness and width of the paving material deposited onto the work surface.

For most operations, the storage capacity of the hopper is insufficient to store all the paving material which will be placed by the paving machine. Therefore, it is typically necessary to periodically or continuously resupply the hopper with paving material to be deposited. To this end, supply machines, such as dump trucks, may be used to deposit paving material ahead of the tractor on the work surface to be paved. The tractor may be equipped with a mechanism for loading the hopper with the paving material dumped on the work surface. One known system utilizes a mechanism known as a windrow elevator to elevate paving material from the work surface into the hopper of the tractor. Other strategies include the use of a material transfer vehicle that picks up loads of paving material deposited at a work site and shuttles the paving material to the hopper, on an as-needed basis.

Thus, the hopper receives the paving material and the conveyor deposits the paving material in front of the transversely extending auger. The auger spreads the paving material laterally in front of the grading implement, which compresses and compacts the material downwardly to form a "mat" of paving material, ideally of uniform thickness and surface finish.

A conventional grading implement or screed is of a set width. However, in certain paving applications, such as driveways, parking lots, and the like, varying the asphalt mat width is required. As a result, width-adjustable or extendable screed arrangements have become common for varying the width of the asphalt mat without interrupting the paving process. Typically, extendable screeds consist of a main screed section of a fixed width and hydraulically extendable "screed extenders" that are capable of extending from each end of the main screed section.

In a normal operation of an asphalt paver, an operator can makes adjustments to affect the depth of the asphalt mat being laid. One adjustment that can be made is related to the amount of paving material that is distributed by the auger in front of the screed. If an insufficient amount of material is delivered in front of the screed, the rotational speed of the auger may be increased. If the amount of material delivered in front of the screed is excessive, the rotational speed of the auger may be decreased. Determining whether an insufficient amount of paving material or an excessive amount of paving material has been deposited in front of the screed may include the use of a sonic sensor, as disclosed in U.S. Pat. No. 4,933,853. The sonic sensor directs a sonic signal towards the paving material that has been spread by the auger and the time interval it takes for the signal to bounce back to the sensor is used to determine the height of the material.

However, the position where this measurement will affect the accuracy of the measurement. For example, the measurement is taken may be compromised if the sonic signal engages the paving material too close to or too far away from the auger or the screed. Hence, the position of the sonic sensor is usually adjustable. However, properly adjusting the position or aim of a sonic sensor is problematic as the operator has no visual indication of the exact location of where the sonic signal engages the paving material.

Accordingly, there exists a need for a reliable and easy to use system and method for adjusting the sensors used to measure the amount of paving material deposited in front of grading implements or screeds of paving apparatuses.

SUMMARY OF THE DISCLOSURE

A system for measuring the height of paving material distributed by an auger in front of a grading implement is disclosed. The system includes a sonic sensor and a laser pointer. The sonic sensor generates a sonic signal and the laser pointer generates a laser beam. The sonic sensor and laser pointer are arranged so the sonic signal and laser beam are aimed at a common position. The sonic sensor and laser pointer are movable, thereby enabling the common position of the sonic signal and laser beam to be moved to a desired position on the material that has been deposited in front of the grading implement by the combined actions of a conveyor and auger.

A paving machine is also disclosed. The paving machine includes a conveyor for depositing material in front of an auger. The auger is disposed between the conveyor and a grading implement. The grading implement is coupled to a first sonic sensor and a first laser pointer. The first sonic sensor generates a first sonic signal and the first laser pointer generates a first laser beam. The first sonic sensor and first laser pointer are arranged so the first sonic signal and first laser beam are aimed at a first common position. The first sonic sensor and first laser pointer are moveable to move the first common position to a first desired position on the material between the grading implement and the auger.

A method for controlling a material feed system of a paving machine is also disclosed. The paving machine includes a grading implement. The material feed system includes a conveyor and an auger disposed between the conveyor and the grading implement. The method includes delivering material from the conveyor to the auger and spreading the material laterally in front of the grading implement by rotating the auger. The method also includes providing a first sonic sensor that transmits a first sonic signal and a first laser pointer that transmits a first laser beam. The first sonic sensor and first laser pointer are arranged so the first sonic signal and first laser beam are directed at a first common position on the material that has been spread laterally by the auger. The method also includes positionally adjusting the first sonic sensor and first laser pointer to move the first sonic signal and first laser beam from the first common position to a first desired position.

In any one or more of the embodiments described above, the laser pointer may be coupled to the sonic sensor.

In any one or more of the embodiments described above, the laser pointer may be connected to the sonic sensor.

In any one or more of the embodiments described above, the laser pointer and sonic sensor are an integrated unit.

In any one or more of the embodiments described above, the laser pointer and sonic sensor may be coupled to an actuator and linked to a controller. The actuator may be linked to the controller. The controller may have a memory programmed to determine the common position where the laser beam and sonic signal meet and cause the actuator to move the laser pointer and sonic sensor to the desired position.

In any one or more of the embodiments described above, a second sonic sensor and a second laser pointer may be included opposite the auger from the first sonic sensor and first laser pointer. The second sonic sensor generates a second sonic signal and the second laser pointer generates a second laser beam. The second sonic sensor and second laser pointer are arranged so the second sonic signal and second laser beam are aimed at a common position. The second sonic sensor and second laser pointer may be moveable to move the second common position to a second desired position on the material between the grading implement and the auger and opposite the auger from the first desired position.

In any one or more of the embodiments described above, the second laser pointer and second sonic sensor may be coupled to a second actuator, all of which may be linked to the controller. The memory of the controller may also be programmed to determine the second common position where the second laser beam and second sonic signal meet and cause the second actuator to move the second laser pointer and second sonic sensor to the second desired position.

In any one or more of the embodiments described above, the movement or positional adjustment of the sonic sensor and laser pointer may be performed manually.

In the method described above, the method may further include determining a height of the material at the first desired position based on the first sonic signal. And, if the height is lower than a desired height, the rotational speed of the auger may be increased. Further, if the height is higher than a desired height, the rotational speed of the auger may be decreased.

DETAILED DESCRIPTION

Figure 1:
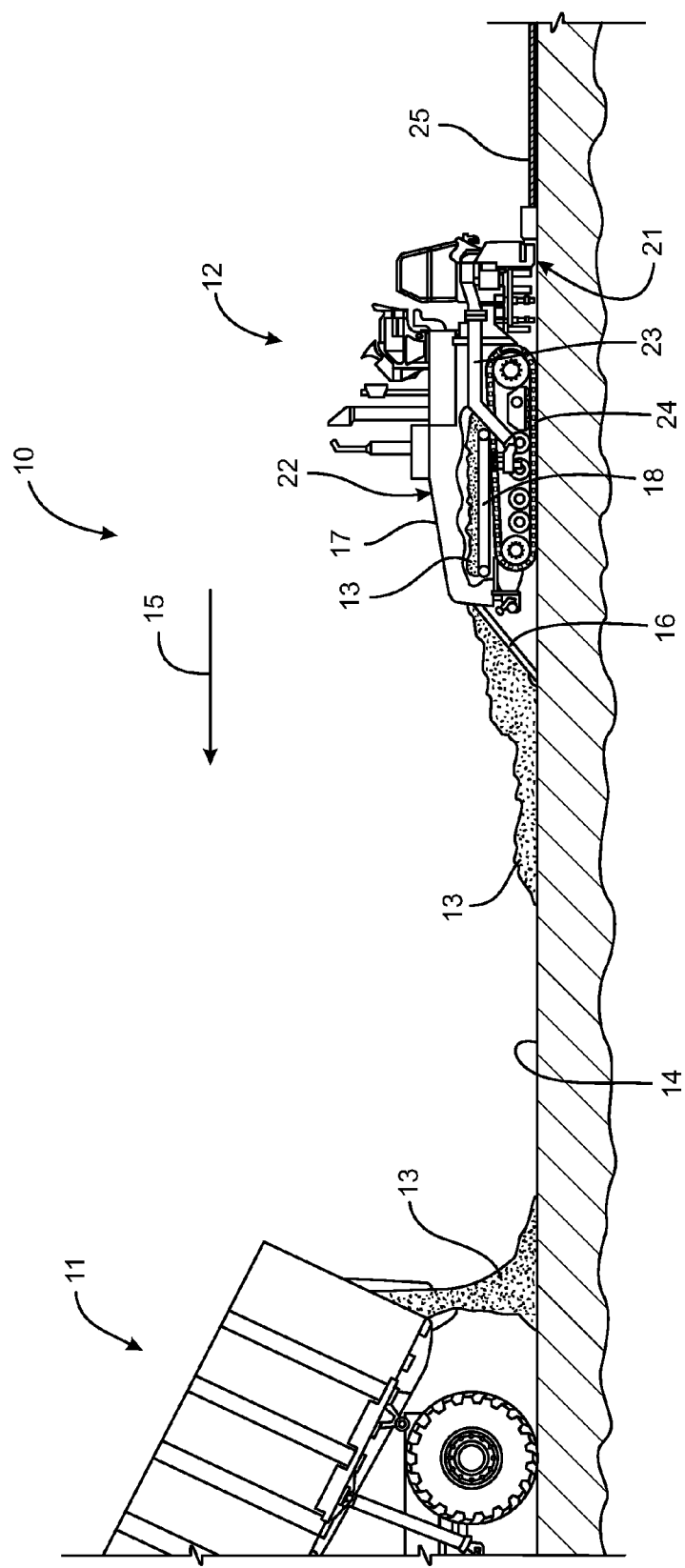
FIG. 1 is a side diagrammatic illustration of a paving system including a dump truck depositing paving material on a work surface and a paving machine collecting loose paving material from the work surface and conveying the loose material through the paving machine before it is compressed into a mat as the paving machine moves in a forwardly direction.

FIG. 1 illustrates a paving system 10 which includes a dump truck 11 and a paving machine 12. The purpose of the dump truck 11 is to deposit loose paving material 13 on a work surface 14. The paving material 13 may be asphalt, aggregate materials or concrete, which would be deposited directly into the hopper 17 of the paving machine 12. The paving machine 12 and dump truck 11 are traveling in the direction of the arrow 15. As the dump truck 11 deposits loose paving material 13 on the work surface 14, the loose paving material 13 may be picked up from the work surface 14 by a device known in the art as a windrow elevator 16 or other similar device. The loose paving material 13 may be delivered to the hopper 17 via the elevator 16. Disposed within or below the hopper 17 is a conveyor 18. The conveyor 18 transports the loose material 13 through the paving machine 12 and towards the grading implement or screed 21, which is disposed at a rear end of the tractor 22 of the paving machine 12. The grading implement 21 is towed behind the tractor 22 by a pair of tow arms 23, only one of which is shown in FIG. 1. The tractor 22 may also include a plurality of ground engaging elements 24 that may be in the form of an endless track as shown in FIG. 1 or wheels or the like for propelling the paving machine 12 along the work surface 14. As discussed below in connection with FIGS. 2-5, the loose paving material 13 is deposited by the conveyor 18 in front of the auger 26 and the grading implement or screed 21, which compacts the loose paving material 13 into a mat 25 shown behind the paving machine 12 in FIG. 1.

Figure 2:
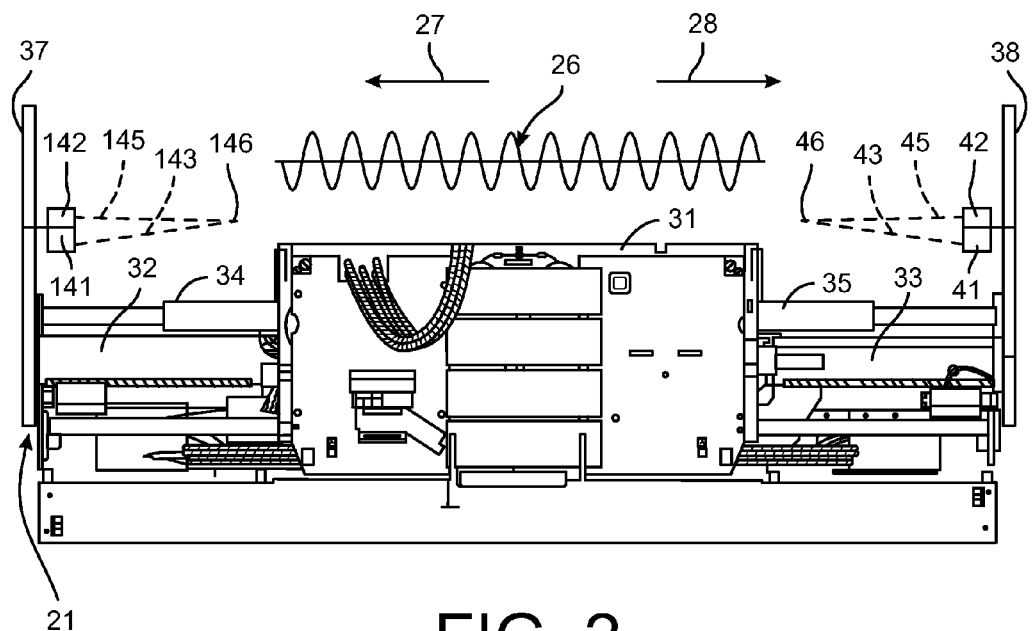
FIG. 2 is a top plan view of a grading implement or screed and an auger that is towed behind the tractor portion of the paving machine illustrated in FIG. 1.

Turning to FIG. 2, controlling the thickness of the mat 25 shown in FIG. 1 is problematic. Specifically, the system for feeding the loose paving material 13 to the conveyor 18 is not a steady state system. Whether the loose paving material 13 is delivered to the work surface 14 via a dump truck 11 or whether the loose paving material 13 is deposited directly into the hopper 17 via another type of vehicle, the conveyor 18 may run continuously, thereby depositing loose paving material in front of the auger 26 shown in FIG. 2 unevenly or somewhat inconsistently. The purpose of the auger 26 is to distribute the loose paving material 13 laterally outward in the directions of the arrows, 27, 28 so that a relatively even amount of loose paving material 13 is distributed in front of the screed 21. It will be noted in FIG. 2 that the screed 21 includes a main screed section 31 along with two screed extenders 32, 33 that may be extended or retracted mechanically or hydraulically, such as the hydraulic cylinders 34, 35.

To maintain a correct amount of loose paving material 13 in front of the screed 21, the auger 26 must be rotated at an appropriate rotational speed. To determine whether the rotational speed of the auger 26 is set correctly, a measurement of the height of the loose paving material 13 may be taken in a manner illustrated in FIG. 3. Specifically, a screed 21, whether extendable or not, will include a pair of endgates 37, 38 as shown in FIG. 2. Returning to FIG. 3, the endgate 38 is coupled to a sonic sensor 41 and a laser pointer 42. The sonic sensor 41 may be coupled to or directly connected to the laser pointer 42. Also, the sonic sensor 41 and laser pointer 42 may be part of an integrated unit. Regardless, the sonic sensor 41 transmits a sonic signal 43 to the loose paving material 13 disposed between the auger 26 and the screed 21.

Figure 3:
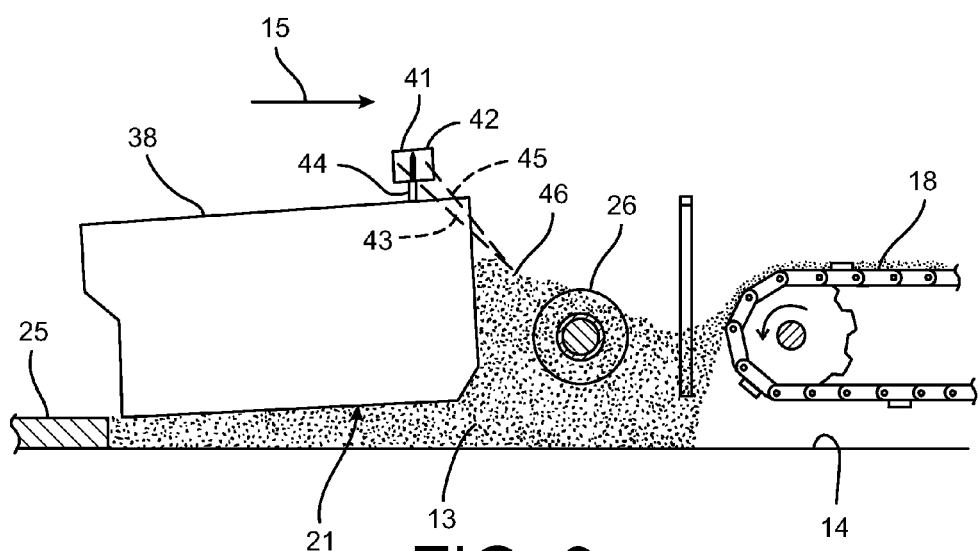
FIG. 3 is a side view of a portion of a paving machine showing an end gate of a grading implement, an auger and conveyor.

As seen in FIG. 3, the loose paving material 13 disposed between the auger 26 and the screed 21 is not a level pile. Thus, the height measurement made by the sonic sensor 41 will vary, depending upon where the measurement is taken or, in other words, where the sonic signal 43 is directed. The proper location for making the sonic measurement using the sonic sensor 41 may vary. For example, for one particular machine, a proper measurement may be taken at a point disposed about six inches (15.2 cm) in front of the screed 21. The proper place for making the sonic measurement may depend upon the particular paving machine 12 being utilized, the distance between the auger 26 and the screed 21 and possibly the distance between the auger 26 and the conveyor 18. Regardless, a seasoned operator of a paving machine 12 or the manufacturer of the paving machine 12 will make a determination as to the proper location for measuring the height of the loose paving material 13.

However, because the screed 21 floats behind the tractor 22 by way of the tow arms 23 (see FIG. 1), the direction of the sonic signal 43 or the position of the sonic sensor 41 may need regular adjustment. Thus, the sonic sensor 41 may be pivotally coupled to the endgate 38 or mounted to the endgate 38 via a support 44 that permits a positional adjustment of the sonic sensor 41. However, even though the position of the sonic sensor 41 and therefore the direction of the sonic signal 43 may be adjusted, the operator has no visual indication as to whether the adjustment is accurate or whether the sonic signal 43 is engaging the loose paving material 13 at the proper location.

To assist the operator in this regard, a laser pointer 42 is provided that transmits a laser beam 45 towards the loose asphalt material 13. The laser beam 45 provides a visual indication to the operator regarding the position of the engagement of the sonic signal on the loose paving material 13 as the sonic sensor 41 and laser pointer 42 are arranged so that the sonic signal 43 and laser beam 45 engage the loose paving material at a common position 46. If the common position 46 is not a desired position, based upon the particular paving machine 12 being utilized, the speed of the auger 26, the speed of the conveyor 18, the characteristics of the paving material 13, etc., the position of the sonic sensor 41 and laser pointer 42 may be adjusted to the desired position and the laser pointer 42 provides a visual indication to the operator as to the location of the common position 46 which enables the operator to ensure that the common position 46 is, in fact, the desired position.

In FIG. 3, the sonic sensor 41 and laser pointer 42 are mounted on the right endgate 38. In some situations, it may be advisable to add a second sonic sensor 141 and a second laser pointer 142 on the left endgate 37 or on both endgates 37, 38 as opposed to only a single endgate 38. Thus, the embodiment illustrated in FIG. 2 may include a single sonic sensor 41 and a single laser pointer 42 or dual sonic sensors 41, 141 and dual laser pointers 42, 142. The additional sonic sensor 141 and laser pointer 142 will transmit an additional sonic signal 143 and an additional laser beam 145 as shown in FIG. 2. The embodiment illustrated in FIG. 2 also includes a single auger 26, although dual augers are possible as shown in FIG. 4.

Figure 4:
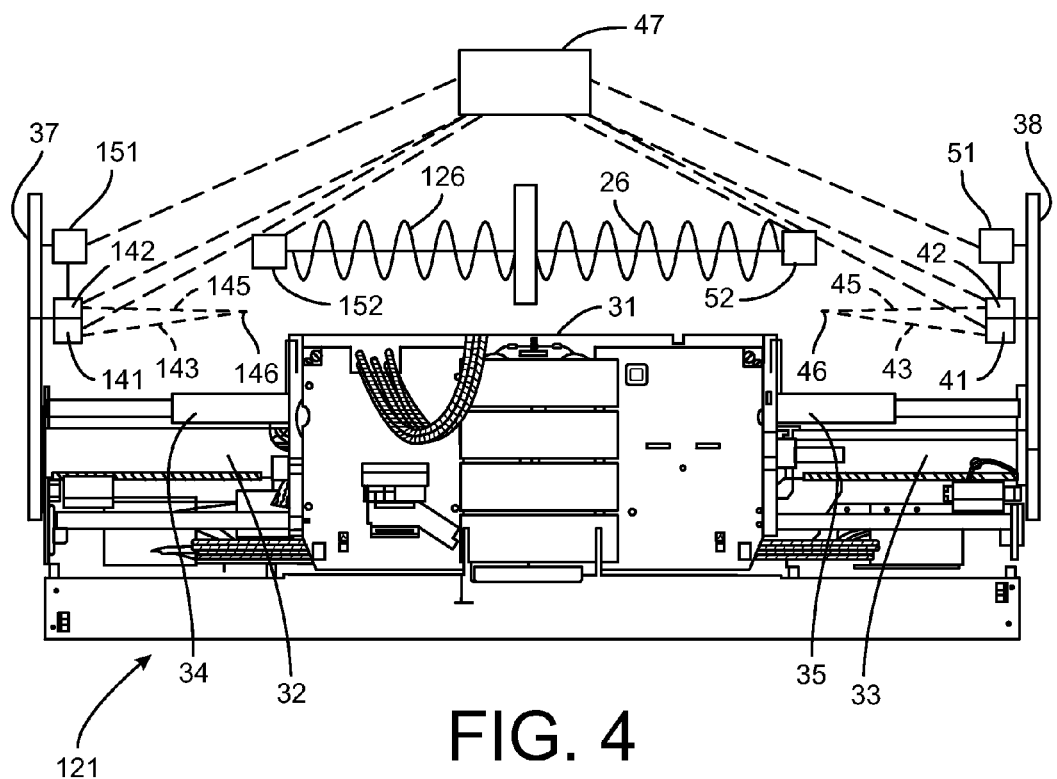
FIG. 4 is a top plan view of another grading implement that can be towed behind the paving machine illustrated in FIG. 1 and that is equipped with dual augers, dual sensors, dual actuators for adjusting the position of the sensors and a controller for controlling the actuators.
Figure 5:
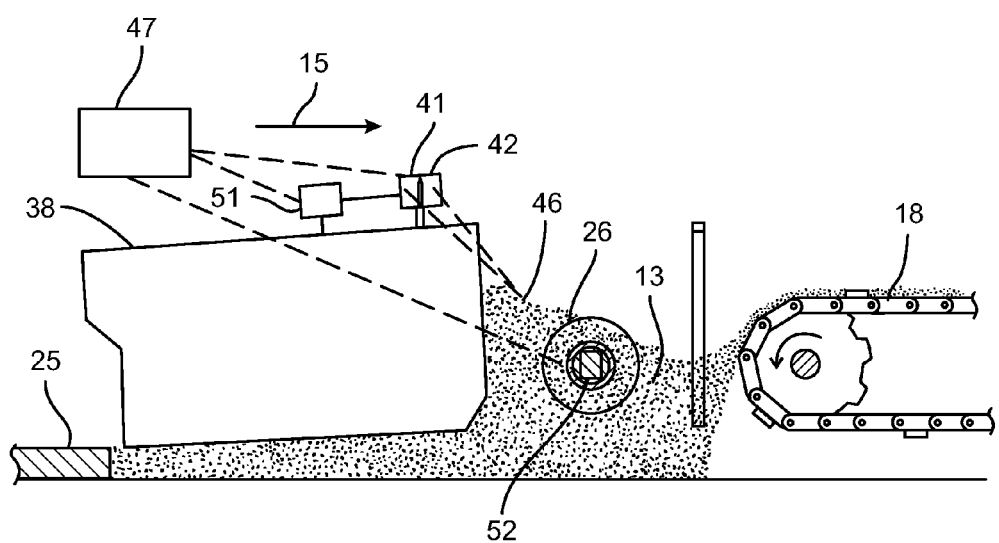
FIG. 5 is another partial end view of a paving machine similar to the view illustrated in FIG. 3 but further illustrating the use of an actuator for adjusting the position of the sensor and laser pointer and a controller for controlling the actuator and rotational speed of the auger.

Turning to FIG. 4, a screed 121 is shown with dual augers 26, 126, dual sonic sensors 41, 141, and dual laser pointers 42, 142. In addition, instead of a manual adjustment system as illustrated in FIGS. 2-3, a computerized adjustment system is illustrated in FIGS. 4 and 5. Specifically, each sonic sensor 41, 141 and each laser pointer 42, 142 may be linked to a controller 47. The controller 47 is linked to actuators 51, 151 which adjust the position of the sonic sensor 41/laser pointer 42 and sonic sensor 141/laser pointer 142 respectively. Further, the controller 47 may also be linked to actuators 52, 152 that control the rotational speed of the augers 26, 126 respectively.

Thus, as will be apparent to those skilled in the art, the controller 47 may include a memory programmed to determine whether the common positions of the sonic signals 43, 143 and laser beams 45, 145 are accurate or if one or both of the common positions 46, 146 need to be relocated to a desired position between the augers 26, 126 and the screed 121. If the common positions 46, 146 are out of place, the controller 47 may then send signals to the actuator 51 and/or 151 to adjust the positions of the sonic sensor 41/laser pointer 42 and/or sonic sensor 141/laser pointer 142. As shown in FIG. 4, the controller 47 may also be used to adjust the rotational speeds of the augers 26, 126 by way of controlling the actuators 52, 152 respectively. It will be also noted that the embodiment of FIG. 4 need not include dual sonic sensors 41, 141, dual laser pointers 42, 142 and dual augers 26, 126. The controller 47 may simply be linked to a single sonic sensor 41, a single laser pointer 42, a single actuator 51 and, optionally, a single auger 26.

INDUSTRIAL APPLICABILITY

Thus, a system for measuring the height of paving material distributed by an auger in front of a grading implement or screed is disclosed that is based upon a sonic or an ultrasonic measurement. To facilitate the operators ability to direct the sonic signal to the desired position on the paving material that has been distributed by the auger, a laser pointer may be incorporated with, coupled to or connected to the sonic or ultrasonic sensor. The laser pointer provides the operator with a visual indication as to where the height measurement of the loose paving material is being taken. The system may be manual, meaning that the operator may manually adjust the position of the sonic sensor/laser pointer or the system may be automated using a controller and an actuator for moving the sonic sensor/laser pointer. Further, the system may include a sonic sensor/laser pointer combination at both endgates of a screed and such a system with dual sonic sensors and dual laser pointers may be appropriate for screeds having dual augers.

An automated version of the system may include a controller that is linked to an actuator for controlling or adjusting the orientation of the sonic sensor/laser pointer combination so that the common position where the sonic signal and laser beam meet is disposed at a desired position on the loose material that has been distributed by the auger or augers. Thus, disclosed herein are systems for measuring the height of loose paving material distributed by one or more augers in front of a paving machine screed whereby the height measurement is made sonically and a visual indication of where the height measurement is being made is provided by a laser pointer that may be coupled to, connected to or integrated with the sonic sensor. Such a sonic sensor/laser pointer combination may be mounted on both endgates, which may be advantageous for paving systems using dual augers.

A method for controlling a material feed system of a paving machine is also disclosed. The method includes delivering paving material from a conveyor of a paving machine tractor to an auger or the work surface in front of the auger. As the paving machine moves forward, the rotating auger spreads the material laterally in front of the grading implement or screed. The method further includes providing a sonic sensor that transmits a sonic signal and a laser pointer that transmits a laser beam. The sonic sensor and laser pointer are arranged so that the sonic signal and laser beam are directed at a common position on the material that has been spread laterally by the auger. The method also includes positionally adjusting the sonic sensor and laser pointer to move the sonic signal and laser beam from a common position to a desired position which will provide the needed measurement.

What is claimed is:

1. A paving machine comprising:
   a conveyor for depositing paving material in front of an auger,
   the auger disposed between the conveyor and a grading implement,
   the grading implement having a first sonic sensor and a first laser pointer mounted thereto by a support that permits positional adjustment of the first sonic sensor and first laser pointer relative to the grading implement,
   the first sonic sensor generating a first sonic signal and the first laser pointer generating a first laser beam, the first sonic sensor and first laser pointer being arranged so the first sonic signal and first laser beam are not parallel and meet at a first common position,
   the support enabling the first sonic sensor and first laser pointer to be movable from the first common position to a first desired position on the material between the grading implement and the auger,
   wherein the first laser pointer and first sonic sensor are coupled to a first actuator and linked to a controller, the first actuator is linked to the controller, the controller having a memory programmed to determine the first common position where the first laser beam and first sonic signal meet and cause the first actuator to move the first laser pointer and first sonic sensor to the first desired position.

2. The paving machine of claim 1 wherein the first laser pointer is coupled to the first sonic sensor.

3. The paving machine of claim 1 wherein the first laser pointer is connected to the first sonic sensor.

4. The paving machine of claim 1 wherein the first laser pointer and first sonic sensor are an integrated unit.

5. The paving machine of claim 1 further including a second sonic sensor and a second laser pointer disposed opposite the auger from the first sonic sensor and first laser pointer,
   the second sonic sensor generating a second sonic signal and the second laser pointer generating a second laser beam, the second sonic sensor and second laser pointer being arranged so the second sonic signal and second laser beam are not parallel and are aimed at a second common position,
   the second sonic sensor and second laser pointer being movable to move the second common position to a second desired position on the material between the grading implement and the auger and opposite the auger from the first desired position.

6. The paving machine of claim 5 wherein the second laser pointer and second sonic sensor are coupled to a second actuator and linked to the controller, the second actuator is linked to the controller, the memory of the controller being programmed to determine the second common position where the second laser beam and second sonic signal meet and cause the second actuator to move the second laser pointer and second sonic sensor to the second desired position.

7. A method for controlling a material feed system of a paving machine having a grading implement, the material feed system including a conveyor and an auger disposed between the conveyor and the grading implement, the method comprising:
   delivering material from the conveyor to the auger,
   spreading the material laterally in front of the grading implement by rotating the auger,
   providing a first sonic sensor that transmits a first sonic signal and a first laser pointer that transmits a first laser beam, the first sonic sensor and first laser pointer being adjustably mounted on the grading implement and being arranged so the first sonic signal and first laser beam are not parallel and meet at a first common position on the material upstream of the grading implement and that has been spread laterally by the auger, and
   positionally adjusting the first sonic sensor and first laser pointer relative to the grading implement to move the first sonic signal and first laser beam from the first common position to a first desired position,
   wherein the first laser pointer and first sonic sensor are coupled to a first actuator and linked to a controller, the first actuator is linked to the controller, the method further including:
   determining the first common position, and
   using the first actuator to positionally adjust the first laser pointer and first sonic sensor to the first desired position.

8. The method of claim 7 wherein the positionally adjusting of the first sonic sensor and first laser pointer is performed manually.

9. The method of claim 7 further including:
   determining a height of the material at the first desired position based on the first sonic signal,
   if the height is lower than a desired height, increasing a rotational speed of the auger, and
   if the height is higher than a desired height, decreasing the rotational speed of the auger.

10. The method of claim 7 further including:
    providing a second sonic sensor that transmits a second sonic signal and a second laser pointer that transmits a second laser beam, the second sonic sensor and second laser pointer being arranged so the second sonic signal and second laser beam are not parallel and are directed at a second common position on the material spread laterally by the auger but opposite the auger from the first common position, and
    positionally adjusting the second sonic sensor and second laser pointer to move the second sonic signal and second laser beam from the second common position to a second desired position.

11. The method of claim 7 wherein the first laser pointer is coupled to the first sonic sensor.

12. The method of claim 7 wherein the first laser pointer is connected to the first sonic sensor.

13. The method of claim 7 wherein the first laser pointer and first sonic sensor are an integrated unit.

* * * * *